United States Patent [19]

Affa

[11] Patent Number: 5,611,148

[45] Date of Patent: Mar. 18, 1997

[54] LOW VIBRATION FASTENING OF A SCALE TO A CARRIER OF A POSITION MEASURING ARRANGEMENT

[75] Inventor: Alfred Affa, Stein/Traun, Germany

[73] Assignee: Dr. Johannes Heidenhain GmbH, Traunreut, Germany

[21] Appl. No.: 396,830

[22] Filed: Mar. 2, 1995

[30] Foreign Application Priority Data

Mar. 2, 1994 [DE] Germany .................... 44 06 797.6

[51] Int. Cl.⁶ .................................................. G01B 11/04
[52] U.S. Cl. .................................................. 33/702; 33/706
[58] Field of Search ........................ 33/700, 702, 703, 33/704, 705, 706, 707, 708

[56] References Cited

U.S. PATENT DOCUMENTS

| | | | |
|---|---|---|---|
| 4,070,759 | 1/1978 | Nelle | 33/706 |
| 4,444,504 | 4/1984 | Takizawa | 33/706 |
| 4,492,033 | 1/1985 | Ichikawa | 33/706 |
| 4,569,137 | 2/1986 | Ichikawa | 33/706 |
| 4,593,471 | 6/1986 | Nelle | 33/702 |
| 4,815,213 | 3/1989 | McCabe et al. | 33/702 |
| 5,065,525 | 11/1991 | Szenger | 33/707 |
| 5,115,573 | 5/1992 | Rieder et al. | 33/707 |
| 5,157,846 | 10/1992 | Fromme | 33/700 |
| 5,182,867 | 2/1993 | Nelle | 33/702 |
| 5,279,043 | 1/1994 | Rieder et al. | 33/702 |

FOREIGN PATENT DOCUMENTS

| | | |
|---|---|---|
| 2505587 | 8/1976 | Germany . |
| 2643304 | 4/1978 | Germany . |
| 3605789 | 4/1987 | Germany . |

*Primary Examiner*—G. Bradley Bennett
*Attorney, Agent, or Firm*—Brinks Hofer Gilson & Lione

[57] ABSTRACT

In the position-measuring arrangement having a groove formed in a housing for the fastening of a measurement embodiment. So that different expansion coefficients of the housing and of the measurement embodiment will cause no measurement errors, the measurement embodiment is fastened longitudinally slidable with respect to the housing in the groove. This is achieved by providing in the zone in which the measurement embodiment is held in the groove a sealing compound. A separating layer is provided between measurement embodiment and sealing compound to provide longitudinal movement.

29 Claims, 4 Drawing Sheets

LOW VIBRATION FASTENING OF A SCALE TO A CARRIER OF A POSITION MEASURING ARRANGEMENT

BACKGROUND OF THE INVENTION

The present invention relates to an improved fastening for the housing of a position measuring arrangement, and in particular, a low-vibration fastening arrangement. Position measuring arrangements are used to measure the relative position of two components such as a machine tool or a coordinate measuring machine.

German patent application number DE 25 05 587 C3 discloses a length measuring arrangement in which a measurement embodiment is fastened to a carrier body by an adhesive layer. The adhesive layer is elastic in order to avoid measurement inaccuracies caused by differing thermal expansion coefficients of the measurement embodiment and the carrier body. Because the measurement embodiment is held sufficiently fast by this exclusively elastic fastening layer, vibrations may be introduced in the measurement embodiment. Such vibrations disadvantageously affect the accuracy of measurement obtainable from a measuring arrangement so constructed.

In an attempt to avoid such a disadvantage, German Patent Application number DE 26 43 304 B2 proposed fastening the measurement embodiment to the carrier body so that the measurement embodiment rested on the border of a rectangular groove extending in the measuring direction. The measurement embodiment is joined with the carrier body in its middle section by an inelastic adhesive in the groove and at each end of the measurement embodiment by a highly elastic adhesive in the groove. This also has the disadvantage that the measurement embodiment, by reason of the elastic fastening to exclusively one surface of the carrier body, can be easily excited into vibration. In addition, the direct contact of the measurement embodiment with the border of the groove has the disadvantage that any production conditioned unevenness in the border or groove are transferred to the measurement embodiment which leads to measurement inaccuracies.

In an attempt to avoid vibration errors in the measuring arrangement, U.S. Pat. No. 4,444,504 discloses a measuring arrangement in which the measurement embodiment is not fastened to the carrier body only over one surface. Instead, a longitudinal groove is made in the carrier body for reception of the measurement embodiment. The measurement embodiment stands in direct contact with a side surface of the groove and with the base surface of the groove. The space between the other side surface of the groove and a surface of the measurement embodiment facing that side surface is filled with a rubber bar and an elastic adhesive. The measurement embodiment is further fastened by a clamp in a subregion of the measurement embodiment that is enclosed in the groove. A disadvantage with such a measuring arrangement is that the space filled by the elastic adhesive is relatively wide which again has a negative effect on the vibration properties of the measurement embodiment. Also, the use of the rubber bar to hold the measurement embodiment in place hampers free expansion between the measurement embodiment and the carrier body.

U.S. Pat. No. 4,492,033 discloses the use of individual rubber rods spaced apart from one another in the measuring direction X are provided to clamp the measurement in the housing. In addition, the measurement embodiment is supported on the bottom of the groove over a spacer. One problem with such a construction is that section-wise differing forces act on the measurement embodiment which can lead to inaccuracies in measurement.

German Patent Application number DE 36 05 789 C1 discloses a position measuring embodiment which is fastened in a groove formed in the carrier body. In particular, the measurement embodiment is embedded on its narrow side in a permanent elastic sealing compound. In order to ensure length expansion between the measurement embodiment and the carrier body, the sealing compound must be highly elastic. Such an elastic layer, however, introduces the negative influences of vibrations thereby compromising the stability of the measuring embodiment.

It is thus desirable to provide a position measuring arrangement in which unequal thermal properties of the measurement embodiment and the carrier body impart virtually no falsifications of the measuring result. In addition, it is desirable to provide a measuring arrangement in which the measurement embodiment is secured relatively vibration-free to the carrier body.

SUMMARY OF THE INVENTION

According to a first aspect of the present invention, there is provided a length measuring arrangement having a measurement embodiment which is scanned by a scanning arrangement includes a carrier body having a groove slidably receiving the measurement embodiment therein wherein at least one gap exists between the measurement embodiment and an interior wall of the groove. A sealing compound fills any gap between the measurement embodiment and the interior walls of the groove to clamp the measurement embodiment in the groove. A separating layer positioned between the sealing compound and a surface of the measurement embodiment allows thermal length changes of the measurement embodiment to occur substantially independently of the housing in the measuring direction.

An advantage of the present invention is found in the provision of a nearly unhampered longitudinal expansion of the carrier body relative to the measurement embodiment. Such expansion is especially pronounced when the measurement embodiment is formed of glass and the carrier body is formed of metal, for example, aluminum. In addition, a low-vibrational fastening of the measurement embodiment is ensured.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENT

Figure 1:
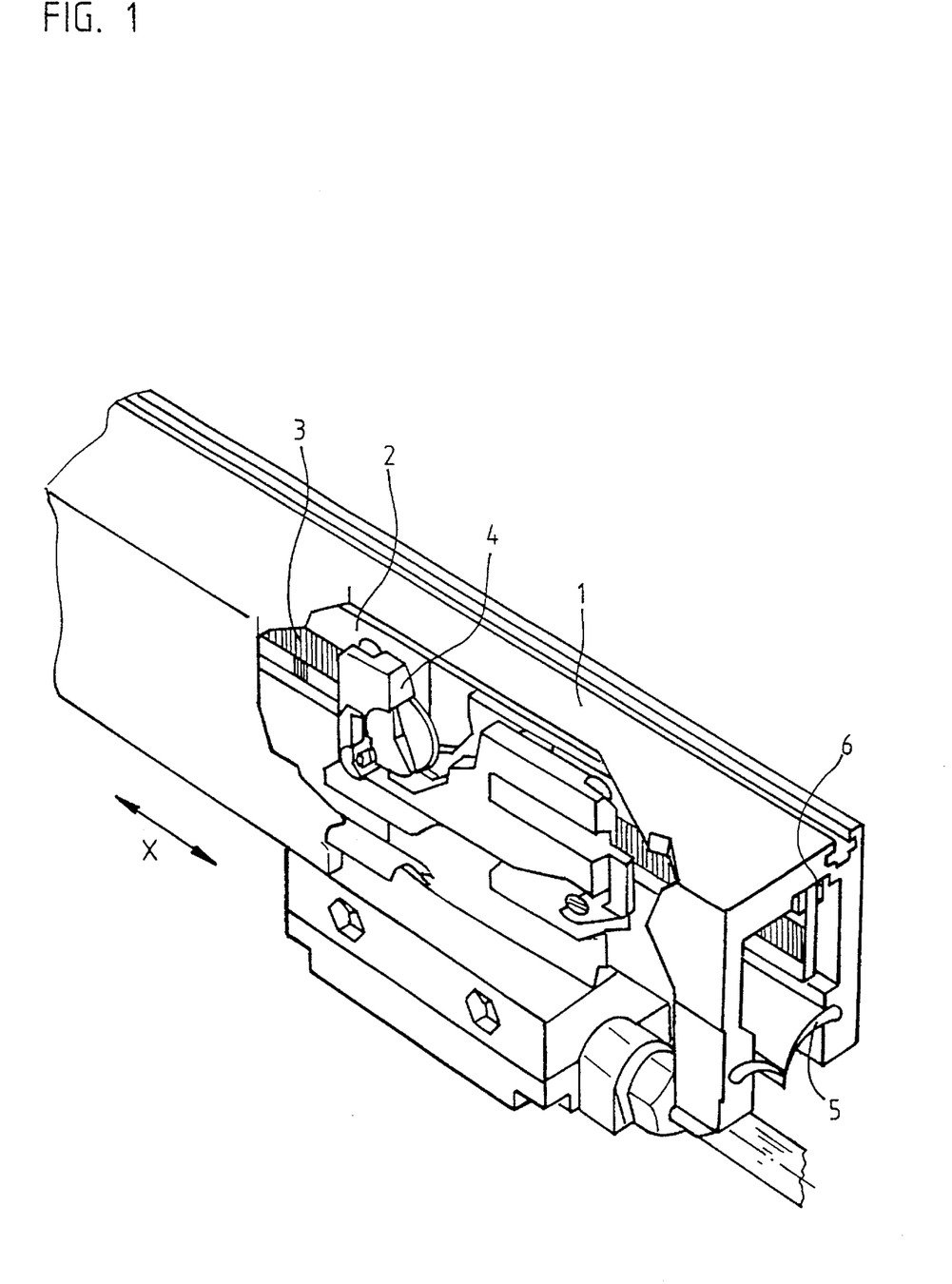
FIG. 1 illustrates a perspective representation of a length measuring arrangement in partial section according to a preferred embodiment of the present invention.

FIG. 1 illustrates a perspective representation of a length measuring arrangement in partial section according to a preferred embodiment of the present invention. The length measuring arrangement includes a housing 1 which serves as a carrier body for a measurement embodiment 2. A graduation 3 is formed on the measurement embodiment 2. In a preferred embodiment, the housing 1 is a hollow body formed of metal, for example aluminum. In the interior of the housing 1 is fastened the measurement embodiment 2 which in a preferred embodiment is formed of glass. The housing 1 is mounted on a first object (not shown) and the scanning arrangement 4 is mounted to a second object (not shown). The first and second objects are relatively movable with respect to one another and the scanning arrangement is positioned to scan the graduation 3 of the measurement embodiment 2. The measurement embodiment 2 and the scanning arrangement 4 are shielded against environmental influences by the housing 1 and seal 5.

A groove 6 extending in the measuring direction X is provided in the interior of the housing 1 to slidably receive the measurement embodiment 2. When the measurement embodiment 2 is positioned in the groove 6 it is held in a relatively stable and vibration-free position.

Figure 2:
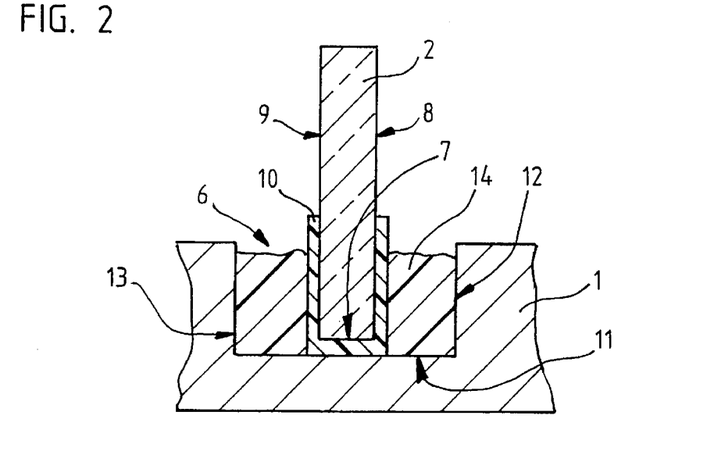
FIG. 2 illustrates in cross-section the length measuring arrangement shown in FIG. 1 taken in a fastening zone of the measurement embodiment.
Figure 5:
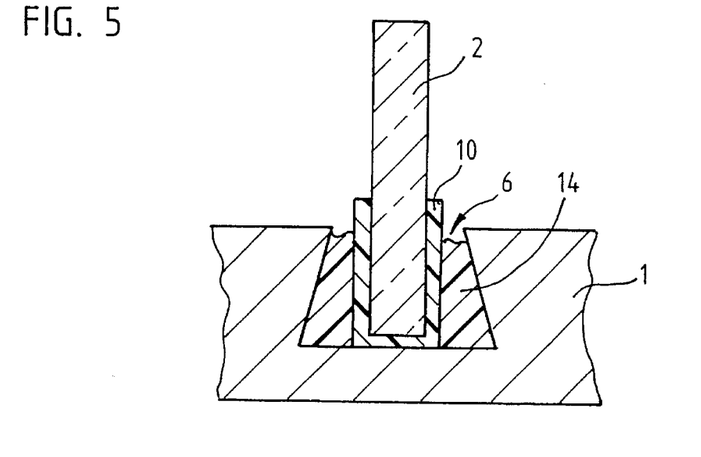

FIG. 2 illustrates in cross-section the length measuring arrangement shown in FIG. 1 taken in a fastening zone of the measurement embodiment. It can be seen that in this preferred embodiment, the groove 6 has a substantially rectangular cross-section. The groove may, however, have other cross-sections as shown in FIG. 5. A thin highly elastic layer 10 is provided on the narrow edge 7 of the measurement embodiment as well as on a portion of each side surface 8 and 9 of the measurement embodiment. In a preferred embodiment, the thickness of layer 10 is about 10 μm. The adhesive layer 10 on the narrow side 7 of the measurement embodiment 2 is in direct contact with the bottom surface 11 of the groove 6, however, gaps exist between the adhesive layer 10 of the side surfaces 8 and 9 and the side surfaces 12 and 13 of the groove 6. These gaps are filled with a sealing compound 14. The adhesive layer 10 between the measurement embodiment 2 and the housing 1 acts as a separating layer which permits relative movement between the measuring embodiment and the housing 1 due to differences in thermal expansion coefficients between the two members in the longitudinal direction X, for example. The sealing compound 14 which hardens relatively solidly ensures that the measurement embodiment 2 despite the possibility of expansion is held with little vibration in the housing 1.

Figure 3:
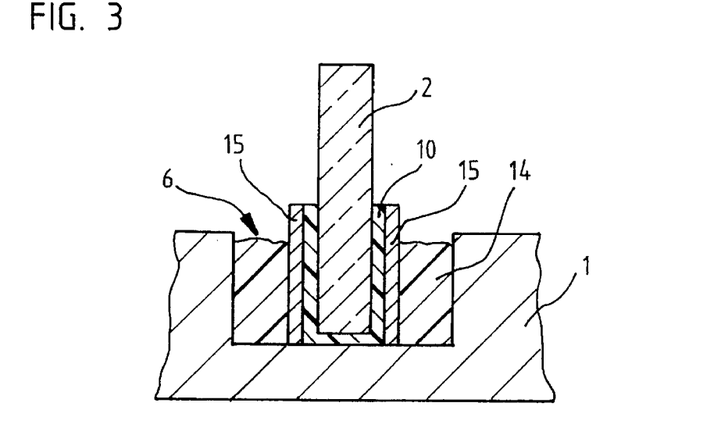
FIG. 3 illustrates in cross-section a fastening zone of a measurement arrangement according to a second preferred embodiment of the present invention.

FIG. 3 illustrates in cross-section a fastening zone of a measurement arrangement according to a second preferred embodiment of the present invention. In this preferred embodiment, which is very similar to that shown in FIG. 2, a slide layer 15 has been added to the adhesive layer 10 on the side surfaces 8 and 9 of the measurement embodiment 2. The slide layer 15 can be, for example, the protective paper of an adhesive foil which forms the adhesive layer 10. An advantage of providing the slide layer 15 is that the longitudinal slidability of the housing with respect to the measurement embodiment 2 is ensured even with great differences of the coefficients of expansion. In addition, in the case of great measuring lengths by adding the slide layer 15 there is additionally made possible a sliding movement between the housing 1 and the measurement embodiment 2.

Figure 4:
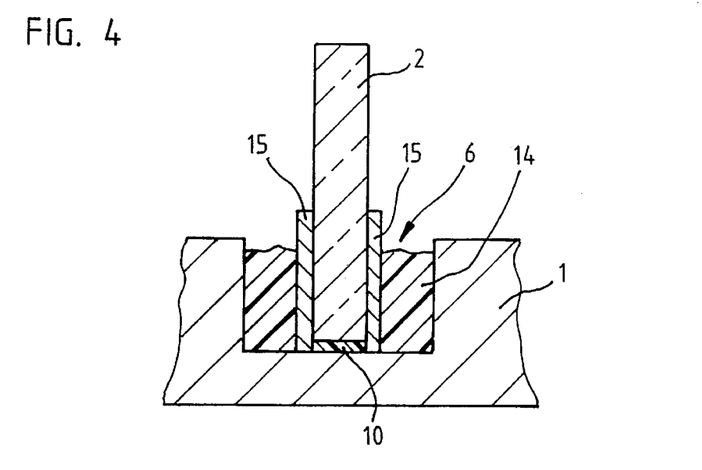
FIGS. 4 through 10 illustrate in cross-section fastening zones of other measurement arrangements according to other preferred embodiments.

FIGS. 4 through 10 illustrate in cross-section fastening zones of other measurement arrangements according to other preferred embodiments. FIG. 4 illustrates a fastening zone having some similarity to that shown in FIG. 2, however, a slide layer 15 is provided on a portion of each side surface 8 and 9 of the measurement embodiment instead of an adhesive layer 10. In this embodiment, the adhesive layer 10 is only provided on the narrow surface 7 of the measurement embodiment 2. Thus, the sealing compound 14 holds the measurement embodiment 2 as vibration-free in the groove 6 yet the sliding layer 15 is provided so that the possibility of expansion of the housing 1 and measurement embodiment 2 is not hampered by the sealing compound 14. The slide layer 15 may be formed by TEFLON foil or a paper containing oil or silicone.

FIG. 5 illustrates in cross-section the fastening zone according to another preferred embodiment. This embodiment is identical to that shown in FIG. 2 except that the shape of the groove 6 has been altered. In particular, the groove 6 is formed so that an optimal form closure between the groove 6 and the sealing compound 14 is achieved. The form closure is accomplished by providing the groove 6 with undercuttings so that the side surfaces 12 and 13 are angled inward as shown, such a profile may be referred to as a swallow tail groove. Other groove profiles of course may be used such as that disclosed in U.S. Pat. No. 5,157,846 which is hereby specifically incorporated by reference. In addition, while the measurement embodiment 2 is shown with the adhesive layer 10 on its narrow edge 7 and side surfaces 8 and 9, other variations are also encompassed such as those shown in FIGS. 3 and 4 as well as those to be discussed.

An advantage of the embodiments shown in FIGS. 2 through 5 is that the fastening of the measurement embodiment 2 in the groove 6 occurs independently of the straightness of the side surfaces 8 and 9 of the groove 6. If, however, it is ensured that at least one side surface of the groove is sufficiently straight, then the measurement embodiment 2 can be fastened against the side surface. FIGS. 6 through 9 illustrate examples of the measurement embodiment 2 fastened to a side surface of the groove 6.

Figure 6:
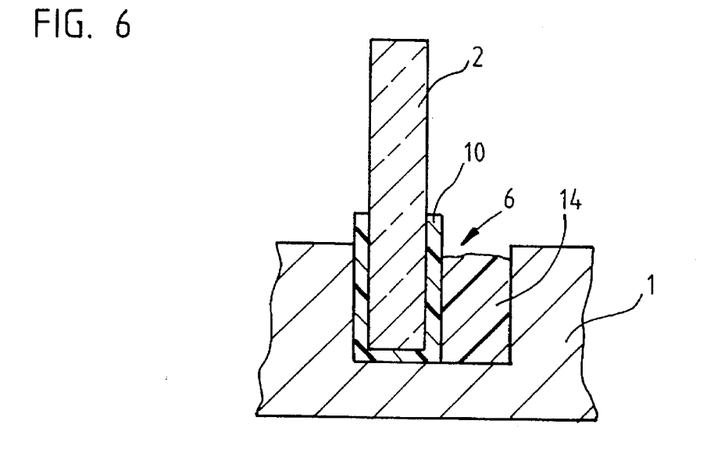

In FIG. 6 the measurement embodiment 2 is provided, as in FIG. 2, with an elastic adhesive layer 10 on the narrow edge 7 as well as on portions of the side surfaces 8 and 9. The adhesive layer 10 on the narrow edge 7 as well as the adhesive layer 10 on one side surface of the measurement embodiment 2 has direct contact with the base surface and a side surface of the groove as illustrated. The gap between the other side surface of the measurement embodiment and groove is filled with the sealing compound 14. The adhesive layer 10 between the measurement embodiment 2 and the sealing compound 14 is the separating layer according to the present invention.

Figure 7:
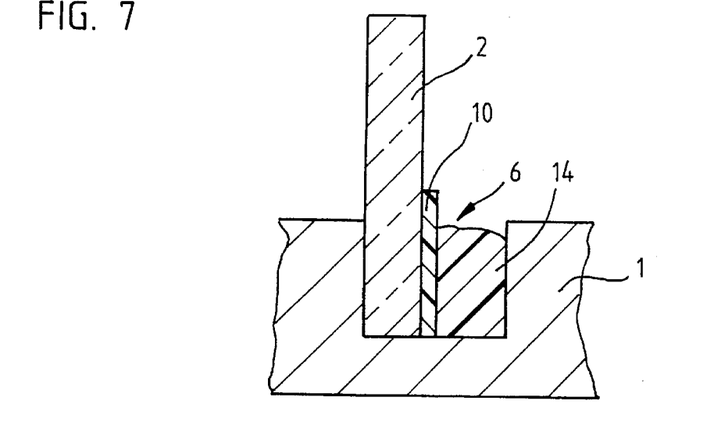

In the embodiment illustrated in FIG. 7 the narrow edge 7 and a portion of one side surface of the measurement embodiment 2 are in direct contact with the base surface and a side surface of groove 6. An adhesive layer 10 is placed on a portion of the other side surface of measurement embodiment 2 and sealing compound 14 clamps the measurement embodiment in place.

Figure 8:
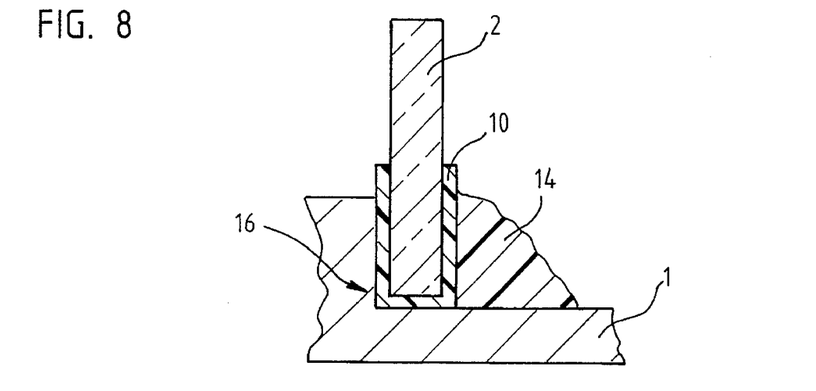

In the embodiment shown in FIG. 8 a rectangular offset 16 is provided instead of a groove. The viscosity of the sealing compound is chosen so that the measurement embodiment can be clamped in place even without a groove.

In the embodiments shown in FIGS. 5 through 8 an adhesive layer 10 is provided as the separating layer, however, the adhesive layer 10 may be replaced by a slide layer 15 as shown in FIG. 4. In addition, other combinations of the adhesive layer 10 and slide layer 15 may be implemented.

Figure 9:
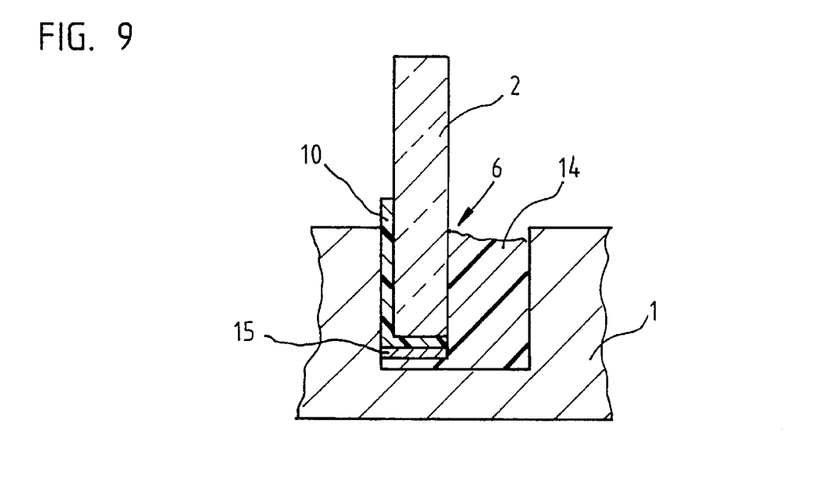

In the embodiment shown in FIG. 9, an adhesive layer 10 is formed on the narrow surface 7 and a portion of one side surface of the measurement embodiment. A slide layer 15 is applied over the adhesive layer 10 only on the narrow surface of the measurement embodiment and the slide layer 15 does not contact the base surface of the groove. Instead a gap is formed under the measurement embodiment. The side surface with the adhesive layer is in direct contact with the side surface of the groove 6. The sealing compound 14 fills the gap formed between the side surface of the measurement embodiment and the side surface of the groove and also fills the gap between the base surface of the groove and the slide layer 15. Thus, in this embodiment, the separating layer consists of the adhesive layer 10 as well as the slide layer 15.

In a preferred embodiment, the spacing between the bottom surface of the groove and the slide layer 15 ranges from about 0.1 to 0.5 mm. This ensures that the measurement embodiment 2 is movable exclusively in the measuring direction X with respect to the housing 1. The thinner the gap for the sealing compound 14, the less the measurement embodiment 2 can be moved perpendicularly with respect to the measuring direction X and the more elastically the sealing compound 14 can harden since the yieldingness also depends upon the thickness of the sealing compound 14.

Figure 10:
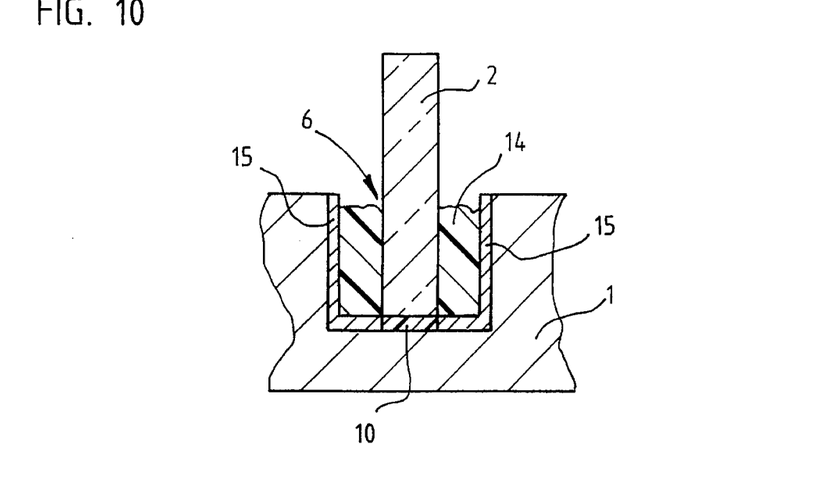

In the embodiment shown in FIG. 10 it is clarified that the separating layer may also be provided between the sealing compound 14 and the surfaces of the housing 1. A groove 6 is provided and the measurement embodiment 2 is fixed with a narrow edge over an adhesive layer 10 to the bottom surface of the groove. Slide layers 15 are applied to the side surfaces of the groove. Sealing compound 14 then fills the gap between the slide layer 15 and the side surfaces of the measurement embodiment 2. The slide layers 15 provide low friction length expansion of the measurement embodiment 2 relative to the housing 1. An additional separating layer may be provided between the measurement embodiment 2 and the sealing compound 14 as well as between the sealing compound 14 and the housing 1.

In a preferred embodiment, the groove 6 has a width of about 6 mm, the thickness of the measurement embodiment 2 is about 3 mm, the thickness of the adhesive layer 10 as well as the slide layer 15 is about 0.1 mm.

Many variations may be made to the embodiments disclosed including constructing the separating layer in several layers, i.e., an adhesive layer between two slide layers for example.

In order to achieve a substantially vibration-free fastening, the sealing compound 14 preferably hardens relatively solidly and is therefore relatively inelastic. The thinner the gap between the measurement embodiment 2 and base surface of the groove (FIG. 10) the more elastically the sealing compound 14 can harden with the same stable fastening effect.

The present invention can also be used with an angle measuring arrangement in which case the graduation is applied on a circular arc.

In addition, the present invention may be used with measurement embodiments formed not only of glass. The measurement embodiment may consist of metal or a synthetic material. Likewise, the present invention is not limited to the photoelectric scanning principle. The measurement embodiment may have a graduation that is based on the capacitive, inductive or magnetic principle of scanning. Also, instead of positioning the measurement embodiment in an encapsulated housing, the measurement embodiment may be provided on a single rail also known as an open system.

While this invention has been shown and described in connection with the preferred embodiments, it is apparent that certain changes and modifications, in addition to those mentioned above, may be made from the basic features of the present invention. Accordingly, it is the intention of the Applicant to protect all variations and modifications within the true spirit and valid scope of the present invention.

What is claimed is:

1. Position measuring arrangement having a measurement embodiment which is scanned by a scanning arrangement for the determination of position measurement values comprising:

a carrier body having a groove extending therein in a measuring direction, the groove slidably receiving the measurement embodiment therein wherein at least one gap exists between the measurement embodiment and an interior wall of the groove;

a sealing compound which hardens relatively solidly filling any gap between the measurement embodiment and the interior walls of the groove to clamp the measurement embodiment in the groove; and a separating layer positioned between the sealing compound and a surface of the measurement embodiment, the separating layer allowing thermal length changes of the measurement embodiment to occur substantially independently of the carrier body in the measuring direction.

2. Position measuring arrangement having a measurement embodiment which is scanned by a scanning arrangement for the determination of position measurement values, the arrangement comprising:

a carrier body having a groove extending therein in a measuring direction, the groove slidably receiving the measurement embodiment wherein at least one gap exists between the measurement embodiment and an interior wall of the groove;

a sealing compound filling any gap between the measurement embodiment and the interior walls of the groove to clamp the measurement embodiment in the groove; and a separating layer positioned between the sealing compound and at least one interior wall of the groove, the separating layer allowing thermal length changes of the measurement embodiment to occur substantially independently of the carrier body in the measuring direction.

3. Position measuring arrangement according to claim 2 wherein the groove has undercuts.

4. Position measuring arrangement according to claim 2 wherein the measurement embodiment is positioned about in the middle of the groove and the sealing compound fills the spaces on both sides of the measurement embodiment.

5. Position measuring arrangement according to claim 2 wherein the measurement embodiment lies against a side surface of the groove and the sealing compound fills the space between the measurement embodiment and the opposite side surface of the groove.

6. Position measuring arrangement according to 2 wherein the separating layer is a highly elastic layer.

7. Position measuring arrangement according to claim 2 wherein the separating layer is a slide layer.

8. Position measuring arrangement according to claim 7 wherein the slide layer is a TEFLON foil.

9. Position measuring arrangement according to claim 7 wherein the slide layer is a paper containing oil.

10. Position measuring arrangement according to claim 7 wherein the slide layer is a paper containing silicone.

11. Position measuring arrangement according to claim 2 wherein the separating layer is a combination of a highly elastic layer and a slide layer.

12. Position measuring arrangement according to claim 11 wherein the separating layer is an adhesive foil in which the slide layer is formed by the protective paper of the adhesive layer.

13. Position measuring arrangement according to claim 2 wherein the separating layer is more elastic than the sealing compound.

14. A position measuring device comprising:

a support body having a groove; and a measurement embodiment having an elastic layer deposited on at least one surface of the scale, the scale disposed in the groove of the support body wherein a sealing compound which hardens relatively solidly is filled in between the elastic layer and the groove.

15. A position measuring device having a measurement embodiment that is scanned by a scanning device for determining position measurement values, the device comprising:

a support body in which the measurement embodiment is fastened, wherein a surface of the measurement embodiment is fixed in place on a surface of the support body by an elastic adhesive layer, thereby creating a space between at least one further surface of the measurement embodiment and a surface of the support body which is filled with a sealing compound which hardens relatively solidly; and a separating layer which permits thermal linear expansion of the measurement embodiment in the measuring direction independently of the support body is placed either between the measurement embodiment and the sealing compound or between the sealing compound and the support body.

16. A position measuring device having a measurement embodiment which is scanned by a scanning device for determining position measurement values, wherein the measurement embodiment is fastened in a groove of a support body, the device comprising:

a casting compound located in a space between a first surface of the measurement embodiment and a first surface of the groove in the support body, as well as between a second surface of the measurement embodiment located opposite the first surface and a second surface of the groove; and a separating layer applied either between the measurement embodiment and the sealing compound which hardens relatively solidly or between the sealing compound and the support body, the separating layer permitting thermal linear expansion in the measuring direction essentially independently of the support body.

17. A method of making a position measuring device, the method comprising the steps of:

providing a measurement embodiment;

providing a support body having a groove extending therein for receiving the measurement embodiment;

fastening the measurement embodiment in the support body;

pouring a sealing compound which hardens relatively solidly into a space between a first surface of the measurement embodiment and the groove as well as between a second surface of the measurement embodiment located opposite of the first surface and the groove; and applying a separating layer which permits thermal linear expansion in the measuring direction essentially independently of the support body either between the measurement embodiment and the sealing compound or between the sealing compound and the support body.

18. A method according to claim 17 wherein the separating layer is more elastic than the sealing compound.

19. A method according to claim 17 wherein the step of fastening the measurement embodiment in the support body includes providing an elastic adhesive layer therebetween.

20. A method for making a position measuring device, the method comprising the steps of:

providing a measurement embodiment;

providing a support body having a groove extending therein for receiving the measurement embodiment;

fixing a surface of the measurement embodiment on a surface of the support body thereby creating a space between at least one further surface of the measurement embodiment and a surface of the support body;

filling the space with a sealing compound which hardens relatively solidly; and placing a separating layer which permits thermal linear expansion of the measurement embodiment in the measuring direction independently of the support body either between the measurement embodiment and the sealing compound or between the sealing compound and the support body.

21. A method according to claim 20 wherein the step of fixing a surface of the measurement embodiment on a surface of the support body includes providing an elastic adhesive layer therebetween.

22. Position measuring arrangement having a measurement embodiment which is scanned by a scanning arrangement for the determination of position measurement values, the arrangement comprising:

a carrier body having a groove extending therein in a measuring direction, the groove slidably receiving the measurement embodiment wherein at least one gap exists between the measurement embodiment and an interior wall of the groove;

a sealing compound filling any gap between the measurement embodiment and the interior walls of the groove to clamp the measurement embodiment in the groove; and a separating layer positioned between the sealing compound and at least one interior wall of the groove, the separating layer being a slide layer of TEFLON foil, the separating layer allowing thermal length changes of the measurement embodiment to occur substantially independently of the carrier body in the measuring direction.

23. Position measuring arrangement having a measurement embodiment which is scanned by a scanning arrangement for the determination of position measurement values, the arrangement comprising:

a carrier body having a groove extending therein in a measuring direction, the groove slidably receiving the measurement embodiment wherein at least one gap exists between the measurement embodiment and an interior wall of the groove;

a sealing compound filling any gap between the measurement embodiment and the interior walls of the groove to clamp the measurement embodiment in the groove; and a separating layer positioned between the sealing compound and at least one interior wall of the groove, the separating layer being a slide layer of paper containing oil, the separating layer allowing thermal length changes of the measurement embodiment to occur substantially independently of the carrier body in the measuring direction.

24. Position measuring arrangement having a measurement embodiment which is scanned by a scanning arrangement for the determination of position measurement values, the arrangement comprising:

a carrier body having a groove extending therein in a measuring direction, the groove slidably receiving the measurement embodiment wherein at least one gap exists between the measurement embodiment and an interior wall of the groove;

a sealing compound filling any gap between the measurement embodiment and the interior walls of the groove to clamp the measurement embodiment in the groove; and a separating layer positioned between the sealing compound and at least one interior wall of the groove, the separating layer being a slide layer of paper containing silicone, the separating layer allowing thermal length changes of the measurement embodiment to occur substantially independently of the carrier body in the measuring direction.

25. Position measuring arrangement having a measurement embodiment which is scanned by a scanning arrangement for the determination of position measurement values, the arrangement comprising:

a carrier body having a groove extending therein in a measuring direction, the groove slidably receiving the measurement embodiment wherein at least one gap exists between the measurement embodiment and an interior wall of the groove;

a sealing compound filling any gap between the measurement embodiment and the interior walls of the groove to clamp the measurement embodiment in the groove; and a separating layer positioned between the sealing compound and at least one interior wall of the groove, the separating layer being a combination of a highly elastic layer and a slide layer wherein the separating layer is an adhesive foil in which the slide layer is formed by the protective paper of the adhesive layer, the separating layer allowing thermal length changes of the measurement embodiment to occur substantially independently of the carrier body in the measuring direction.

26. Position measuring arrangement having a measurement embodiment which is scanned by a scanning arrangement for the determination of position measurement values, the arrangement comprising:

a carrier body having a groove extending therein in a measuring direction, the groove slidably receiving the measurement embodiment wherein at least one gap exists between the measurement embodiment and an interior wall of the groove;

a sealing compound filling any gap between the measurement embodiment and the interior walls of the groove to clamp the measurement embodiment in the groove; and a separating layer positioned between the sealing compound and the measurement embodiment, the separating layer being a slide layer of TEFLON foil, the separating layer allowing thermal length changes of the measurement embodiment to occur substantially independently of the carrier body in the measuring direction.

27. Position measuring arrangement having a measurement embodiment which is scanned by a scanning arrangement for the determination of position measurement values, the arrangement comprising:

a carrier body having a groove extending therein in a measuring direction, the groove slidably receiving the measurement embodiment wherein at least one gap exists between the measurement embodiment and an interior wall of the groove;

a sealing compound filling any gap between the measurement embodiment and the interior walls of the groove to clamp the measurement embodiment in the groove; and a separating layer positioned between the sealing compound and the measurement embodiment, the separating layer being a slide layer of paper containing oil, the separating layer allowing thermal length changes of the measurement embodiment to occur substantially independently of the carrier body in the measuring direction.

28. Position measuring arrangement having a measurement embodiment which is scanned by a scanning arrangement for the determination of position measurement values, the arrangement comprising:

a carrier body having a groove extending therein in a measuring direction, the groove slidably receiving the measurement embodiment wherein at least one gap exists between the measurement embodiment and an interior wall of the groove;

a sealing compound filling any gap between the measurement embodiment and the interior walls of the groove to clamp the measurement embodiment in the groove; and a separating layer positioned between the sealing compound and the measurement embodiment, the separating layer being a slide layer of paper containing silicone, the separating layer allowing thermal length changes of the measurement embodiment to occur substantially independently of the carrier body in the measuring direction.

29. Position measuring arrangement having a measurement embodiment which is scanned by a scanning arrangement for the determination of position measurement values, the arrangement comprising:

a carrier body having a groove extending therein in a measuring direction, the groove slidably receiving the measurement embodiment wherein at least one gap exists between the measurement embodiment and an interior wall of the groove;

a sealing compound filling any gap between the measurement embodiment and the interior walls of the groove to clamp the measurement embodiment in the groove; and a separating layer positioned between the sealing compound and the measurement embodiment, the separating layer being a combination of a highly elastic layer and a slide layer wherein the separating layer is an adhesive foil in which the slide layer is formed by the protective paper of the adhesive layer, the separating layer allowing thermal length changes of the measurement embodiment to occur substantially independently of the carrier body in the measuring direction.

* * * * *

UNITED STATES PATENT AND TRADEMARK OFFICE
CERTIFICATE OF CORRECTION

PATENT NO. : 5,611,148
DATED : March 18, 1997
INVENTOR(S) : Alfred Affa

It is certified that error appears in the above-identified patent and that said Letters Patent is hereby corrected as shown below:

<u>In the Claims</u>

In Claim 6, line 1, after "to" insert --claim--.

Signed and Sealed this

Nineteenth Day of May, 1998

Attest:

BRUCE LEHMAN

Attesting Officer

Commissioner of Patents and Trademarks